United States Patent [19]

Tanaka

[11] Patent Number: 5,001,464

[45] Date of Patent: Mar. 19, 1991

[54] CONTACT DETECTING SYSTEM IN A MACHINE TOOL

[75] Inventor: Yuzuru Tanaka, Higashi, Japan

[73] Assignee: Daishowa Seiki Co., Ltd., Osaka, Japan

[21] Appl. No.: 450,552

[22] Filed: Dec. 14, 1989

[30] Foreign Application Priority Data

Jan. 20, 1989 [JP] Japan .................................. 1-12584

[51] Int. Cl.⁵ .............................................. G08B 21/00
[52] U.S. Cl. ........................................ 340/680; 33/561
[58] Field of Search ................. 340/686, 680; 33/558, 33/561, 832, 706, 708, 710; 364/474.37

[56] References Cited

U.S. PATENT DOCUMENTS

| 4,447,958 | 5/1984 | Tanaka | 33/561 |
| 4,543,732 | 10/1985 | Maples | 33/558 X |
| 4,716,656 | 1/1988 | Maddock et al. | 33/561 X |
| 4,864,294 | 9/1989 | Fukuhisa | 340/680 X |

Primary Examiner—Glen R. Swann, III
Assistant Examiner—Thomas J. Mullen, Jr.
Attorney, Agent, or Firm—Koda and Androlia

[57] ABSTRACT

A contact detecting system in a machine tool, used in combination with a switch-contained touch sensor seared in a spindle of the machine tool having a movable stylus for making an usually closed switch open by moving itself due to contact with an object such as a workpiece to be detected, which can obtain an output from a sensor unit when the stylus is brought into contact with the workpiece.

2 Claims, 1 Drawing Sheet

CONTACT DETECTING SYSTEM IN A MACHINE TOOL

BACKGROUND OF THE INVENTION

The present invention relates to a contact detecting system in a machine tool for detecting the presence of a workpiece by contact herewith with a view to measuring of its position and size and furthermore centering the workpiece, used in combination with a contact detecting instrument, preferably of a touch sensor containing a switch responsive to the physical contact with the workpiece, secured in a spindle of the machine tool.

Known systems for detecting of an object such as a workpiece, which is applied to a machine tool such as a machining center or the like, ordinarily use a touch detecting instrument secured in the spindle to make contact with the object so as to complete or break an electrical circuit by the contact with the object. In a touch detecting instrument of such nature, there are generally known two types of instruments.

The first example is one referred to hereinafter as a touch probe assembly, or a tool having conductive quality such as a drill or a tap, which is made of a conducting material and functions as one part of a circuit itself to make a complete circuit through the contact with an object of conductor like metal material.

The second representative is the one in which a movable stylus is arranged so as to function as one component of an electrical switch, usually in an closed condition for completing an electrical circuit, but in an open condition for disconnecting the circuit when the stylus is brought into contact with an object or workpiece and hence moves itself. The second example is referred to as a switch-contained touch sensor hereinafter in the specification.

At first, the embodied system employing the above-mentioned touch probe assembly of the first example will be described in minute detail with reference to FIG. 3. The machine tool to which the system is applied comprises externally a spindle 2 and a body 4 of which a lower portion is formed as a table for a workpiece 3. The touch probe assembly 1 including a touch probe member like a protrudence which is made of a conductor is secured in the spindle 2, whereby the touch probe assembly 1 can be relatively moved toward and away from the workpiece 3 with a up-and-down motion of the spindle 2. The machine tool is provided furthermore with necessary components of the system. In particular, an annular electromagnetic sensor unit 6 for electromagnetically sensing an electrical circuit followed by an electric current is mounted on the periphery of the spindle 2, and a touch-signal issue circuitry 8 for feeding a touch-signal 7 indicative of the contact of the touch probe assembly 1 with the workpiece 3 is provided in the body of the machine tool. The system on the whole is so formed that the touch-signal 7 is fed by and from the touch-signal issue circuitry 8 to a NC (numerical control) apparatus 9 for controlling the movement of the spindle 2 when the electromagnetical sensor unit 6 electromagnetically senses a closed circuit 5 (passing the spindle 2, the touch probe assembly 1, the workpiece 3, the parts of the body 4 of the machine tool and the foregoing spindle 2) which is made depending on the contact of the touch probe with the workpiece 3 of conductor. The above-described system has, however, a disadvantage in that an object to be detected is limited only to workpieces of a conductor made of metal or the like by reason of utilizing the object as a part of the closed circuit 5.

Next, the other embodied system employing the above-mentioned switch contained touch sensor will be described in minute detail with reference to FIG. 4. The switch-contained touch sensor 12 secured in the spindle 2 of the machine tool contains the switch mechanism 11 insulated from an outside casing, wherein a housed inner-part of the movable stylus 10 functions as a constituent element of the switch mechanism so as to open the switch 11 which is closed usually for completing a circuit and then break the circuit when a bare outer part of the movable stylus is brought in contact with the workpiece 3 and hence moves itself. In order that a complete closed circuit 15, which passes the above-mentioned usually-closed-switch 11 and the body 4 of the machine tool, is formed when the touch sensor 12 is attached in the spindle 2, the casing of the touch sensor 12 is externally provided with a contact terminal 14, whereas the body 4 of the machine tool is provided with an associated terminal bar 13 of a conductor in opposition to the above-mentioned contact terminal 14 of the touch sensor 12. In addition, components in the circuit 15 are connected by wire 16, as needed so that the closed circuit 15 can be completed through one portion of the body 4 of the machine tool, the terminal bar 13, the contact terminal 14, the usually closed-switch 11 and the foregoing body 4.

The second system on the whole is so formed that the touch-signal 7 is fed by and from a touch-signal issue circuitry 17 when the electromagnetic sensor unit 6 surrounding the spindle 2 fails to electromagnetically sense the closed circuit 15 because the circuit 15 is broken by the movement of the movable stylus 10 depending upon the contact with the workpiece 3. The second system never utilizes the object of the workpiece as a part of the closed circuit 15, so that this system can be advantageously used with relation to every workpieces regardless of the qualities of materials including non-conductors, in contrast with the first system which can be used only with a workpiece made of a conductor.

The above-mentioned annular electromagnetic sensor unit 6 which is mounted on the outside of the spindle 2 and incorporated in both the above-mentioned systems comprises, as illustrated in FIG. 4, an exciting coil 18 wound around a ring-shaped core of a magnetizeable material like ferrite so as to cause an induced current to flow in the above-mentioned closed-circuit 5 or 15, a detecting coil 19 wound around the similar core so as to sense the closed circuit 5 or 15 through the generation of a subsequently induced current in oneself, and an annular shielding plate (not shown in the figure) positioned therebetween.

In the first system in which the touch probe assembly is incorporated, when the closed circuit 5 is made by the contact of the touch probe with the workpiece, the subsequently induced current arises in the above-mentioned detecting coil 19 of the sensor unit 6 and flows in the form of output to the touch-signal issue circuitry 8. Accordingly, it is possible to amplify the touch-signal 7 in the circuitry 8 by the utilization of the above-mentioned output.

On the other hand, in the second system in which the switch-contained touch sensor is incorporated, the circuit 15 followed by electric current is made usually, so that the above-mentioned detecting-coil 19 of the sensor unit 16 has a subsequently induced current generated therein. However, when the movable stylus 10 of the touch sensor 12 is brought into contact with the workpiece to open the contained switch 11, the circuit 15 is broken while the subsequent induced-current does not arise at all in the detecting coil 19. On such an occasion, it is necessary to feed the touch-signal 7 by and from the touch signal issue circuitry 17, but an output cannot be obtained from the detecting coil 19, with the result that it is impossible to utilize such an output as energy for amplifying the touch-signal 7 in the circuitry 17. Therefore, in the system using the switch-contained touch sensor, it is necessary to provide the touch-signal issue circuitry 17 internally with a device for amplifying the touch signal 7 so as to feed an appropriate magnitude of the touch-signal 7 from the circuitry 17 when the output from the detecting coil 19 disappears. Or, an operating method in the input side of the NC apparatus 9 arranged at the end is adapted so as to operate only by a low level of input signal.

In other words, as compared to the system employing the touch probe assembly 1, system employing the switch-contained touch sensor 12 has a disadvantage in requiring either exchange touch-signal issue circuitries 8, 17 or modification of an operating method in the input side of the NC apparatus, or else use together with a separate device for inversely changing a condition of the output from the detecting coil 19 of the sensor unit 16.

OBJECT AND SUMMARY OF THE INVENTION

The present invention aims at solving the problems pointed out with respect to the known contact detecting systems in a machine tool, and has for its object to provide an improved contact detecting system in a machine tool, used in combination especially with a detecting instrument of such a type as a switch-contained touch sensor having a movable stylus for making a switch open pursuant to contact with an object to be detected, which can feed an output for amplifying a touch signal from an electromagnetic sensor unit when the switch is made open by the movement of the stylus due to contact with the object, whereby it is possible to utilize a conventional system employing a detecting instrument such as a touch probe assembly which includes a touch-signal issue circuitry designed so as to issue an amplified magnitude of touch signal by utilizing the output fed from the sensor unit when contact is made with a workpiece of conductor, without the exchange of touch-signal issue circuitries in question and the modification of the operating method in the input side of the NC apparatus.

According to the present invention there is provided a contact detecting system in a machine tool which comprises, in combination, a switch-contained touch sensor secured in a spindle of the machine tool and having a movable stylus for making an usually closed switch open by contact with an object such as a workpiece to be detected; and an electromagnetic sensor unit mounted on the periphery of the spindle, for electromagnetically sensing an electrical closed-circuit, and made up of an exciting coil wound around a core for causing an induced current to flow in said closed-circuit and a detecting coil wound around a core for detecting the closed circuit through a subsequent induced-current generated by mutual induction, wherein the touch sensor accommodates a step-up transformer and a control circuit, where the usually closed switch is incorporated, which utilizes an induced current generated in a secondary coil of the transformer as a source of operating power and is designed to feed back an amplified current to the secondary coil of the transformer when the usually closed switch is made open by the movement of the stylus due to contact with the object, while said closed-circuit followed by the induced current passes the spindle of the machine tool, a casing of the touch sensor, a primary coil of the step-up transformer, a contact terminal provided on the casing of the touch sensor, a body of the machine tool communicating with the contact terminal, and connecting-wires, whereby the sensor unit can feed an output for amplifying a touch signal when the usually closed switch is made open and fails to feed an output when the usually closed switch is closed.

DETAILED DESCRIPTION OF THE PREFERRED EMBODIMENT

Figure 1:
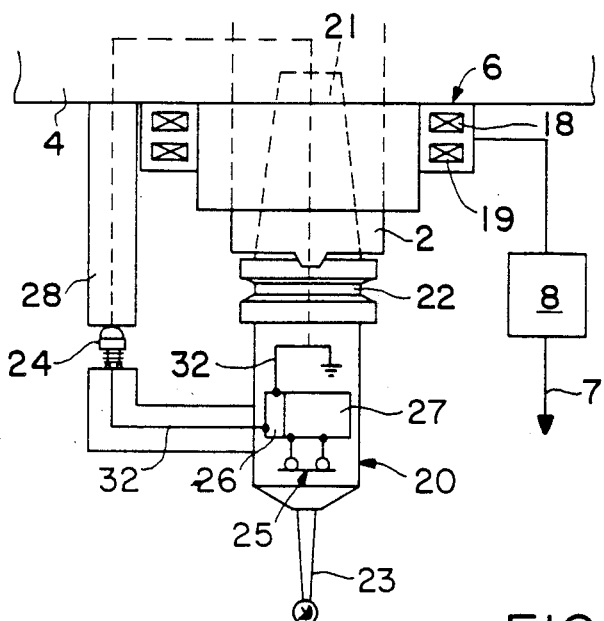
FIG. 1 is a diagramatic side view of a contact detecting system in a, machine tool embodying the present invention.

Referring first to FIG. 1, the numeral 20 designates generally a touch sensor secured in a spindle 2 of a machine tool, which touch sensor 20 is externally comprised of a body (including a tapered shank portion 21 fitted into the main shaft 2 and a grip portion 22 to be grasped by a separate manipulator), a contact terminal 24 provided for electrically communicating with the main body 4 of the machine tool, and a movable stylus 23 capable of shifting due to the contact with a workpiece, while the body of the touch sensor 20 internally accommodates, in a state insulated electrically from the body, a step-up transformer 26, a control circuit 27 connected thereto, and an usually closed switch 25 incorporated in the control circuit 27. The above-mentioned stylus 23, of which one end portion is held in the inside of the touch sensor with a coiled spring (not shown in the drawing) in an unbiased state of ordinarily remaining steady, is so designed and arranged as to open the switch 25 and hence disconnect the controlling circuitry 27 when the stylus 23 is brought into contact with a workpiece and then shifts in any direction. The particular construction and mechanism of the stylus 23 and switch 25 is known in the prior art touch sensor.

The numeral 28 designates a bar-shaped contact terminal of a conductor forming a part of a circuit, which is provided integrally on the body 4 of the machine tool so as to come into contact with the above-mentioned associated contact terminal 24 of the touch sensor 20 just when the touch sensor 20 is firmly fitted in the spindle 2. In addition, by connecting-wires 32 of conductor, the associated contact terminal 24 is connected to a primary coil $L_1$ of the step-up transformer 26, while a secondary coil $L_2$ of the transformer 26 is connected to the outer casing of the touch sensor 20 which communicates electrically with the spindle 2 and main body 4 of the machine tool when the touch sensor 20 is attached to the spindle 2. As a result, a closed circuit 31 is formed which passes through the primary coil $L_1$ of the step-up transformer 26, the wire 32, the contact terminals 24, one part of the main body 4 of the machine tool, the spindle 2, the casing of the touch sensor 20, the wire 32 and the preceding primary coil $L_1$.

Figure 2:
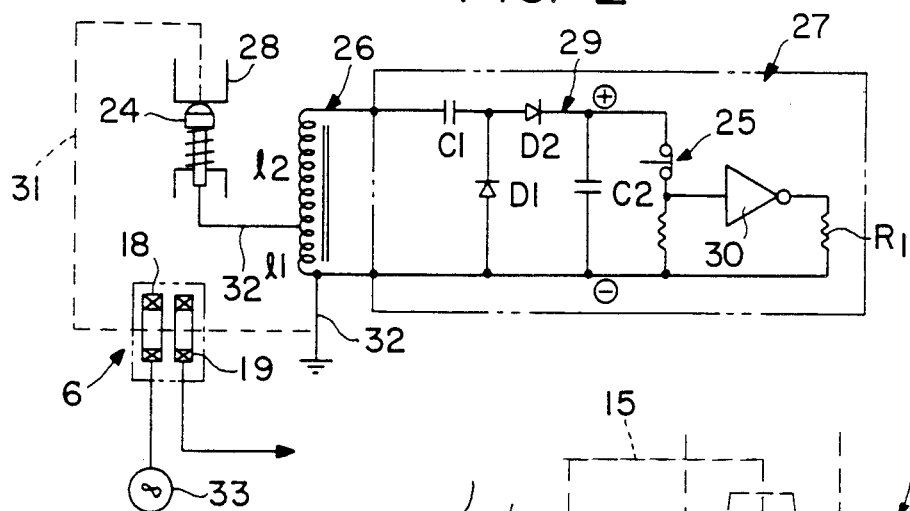
FIG. 2 is a circuit diagram illustrative of the main parts of the same system.

Also, on the periphery of the spindle 2, there is mounted a known annular electromagnetical sensor unit 6 which comprises an exciting coil 18 and a detecting coil 19 wound respectively around a ring-shaped-core, and an annular shielding plate (not shown in the drawing) positioned therebetween. According to this sensor unit 6, the exciting coil 18 to which a high-frequency current is supplied from an electrical energy source 33 as shown in FIG. 2 generates an induced current of a high frequency along the above-described complete circuit 31 owing to a changing electromagnetic-field occurring firstly in the core of the exciting coil 18, when the touch sensor 20 is attached to the main body 4 of the machine tool. Next, the induced current flowing through the circuit 31 produces a changing electromagnetic-field furthermore in the core of the detecting coil 19, whereby a subsequent induced-current of a high frequency arises eventually in the detecting coil 19 and then flows to a touch-signal issue circuitry 8 which feeds a touch signal 7 to a NC apparatus or the like, as in the known system of the same kind.

Referring still to FIG. 2, an input terminal of the above-mentioned control circuit 27 which is accommodated in the body of the touch sensor 20 is connected to a secondary coil $L_2$ of the step-up transformer 26 so as to utilize an induced current generated in the secondary coil $L_2$ as a power supply. The circuit 27 is comprised particularly by a voltage multiplying rectifier 29 including capacitors $C_1$, $C_2$ and diodes $D_1$, $D_2$, which can obtain a substantially double output of d.c. voltage from an a.c. voltage supply; a logic element comprising a NOT gate 30 which functions so as to give a low magnitude of output voltage in relation to a high magnitude of input voltage when the switch 25 is closed, or give a high magnitude of output voltage in relation to a low magnitude of input voltage when the switch 25 is open; and a load resistor $R_1$. The positive side of the rectifier 29 is connected to the above-mentioned switch 25, from which the logic device 30 and the resistor $R_1$ are connected accordingly in series toward the negative side of the rectifier 29.

According to the contact detecting system constructed as described above, when a high-frequency current from an electrical energy source 33 is applied to the exciting coil 18 of the sensor unit 6 in a state where the touch sensor 20 is firmly fitted in the spindle 2, a high-frequency current is induced in the above-mentioned closed-circuit 31 indirectly by way of mutual induction. Then, the induced current flows in the primary coil $L_1$ of step-up transformer 26, while a separate high-frequency current is mutually induced and stepped up to a high voltage in the secondary coil $L_2$ of the step-up transformer. The induced alternating-current of a stepped-up voltage is rectified and amplified to a d.c. double voltage by the voltage multiplying rectifier 29, whereby this rectified current can be utilized as a d.c. power source to operate the NOT gate 30. As a result, when the usually closed switch 25 is usually closed as a result of the movable stylus 23 of the touch sensor 20 not touching a workpiece, a relatively high magnitude of voltage is impressed on the input terminal of the NOT gate 30 while a relatively low magnitude of voltage only is produced in the output terminal of the NOT gate 30, so that a small current of some $\mu$ A flows into the secondary coil $L_2$ of the step-up transformer 26. Accordingly, there is substantially no current flowing through the primary coil $L_1$ of the step-up transformer 26 or the above-mentioned closed-circuit 31, so that the closed circuit 31 is put in the same state as it is open. Therefore, a subsequent current eventually fails to be induced in the detecting coil 19 of the sensor unit 6.

On the other hand, when the usually closed switch 25 is caused to be open owing to the touch of the movable stylus 23 of the touch sensor 20 with a workpiece, a relatively low magnitude of voltage is impressed on the input terminal of the of NOT gate 30 while a relatively high magnitude of voltage is produced in the output terminal of the NOT gate 30, so that a remarkably increased amount of current flows into the secondary coil $L_2$ of the step-up transformer 26 through the load resistor R. Accordingly, an induced current is remarkably generated in the primary coil $L_1$ of the step-up transformer 26, and then the induced current flows through the above-mentioned closed-circuit 31, so that a subsequent induced-current arises in the detecting coil 19 of the sensor unit 6, being fed as an output to the touch-signal issue circuitry 8.

Figure 3:
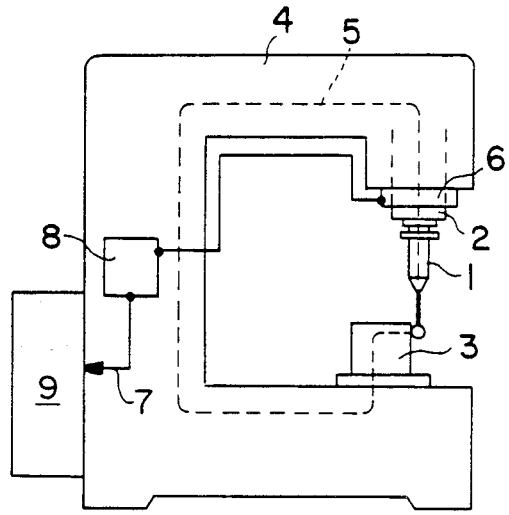
FIGS. 3 and 4 are diagramatic side views of conventional systems of the prior art, respectively.
Figure 4:
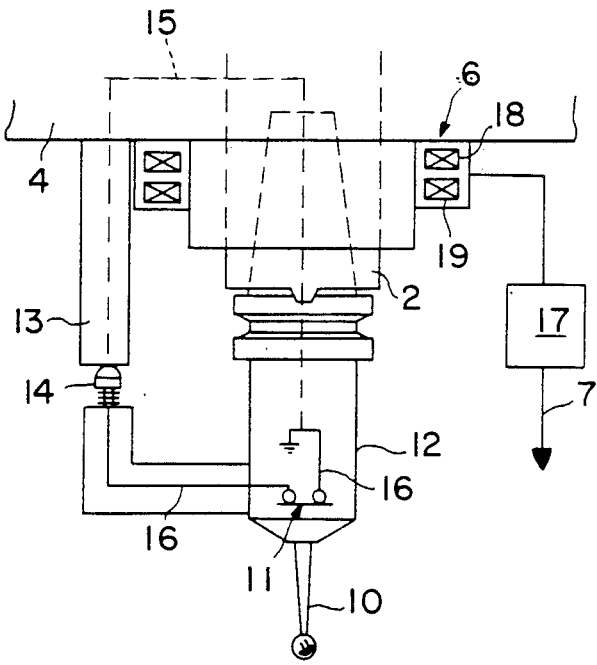

In other words, in contrast to the effect of the known system shown in FIG. 4 which uses the switch-contained touch sensor 19 together with the sensor unit 6, the system of the present invention has an effect of generating a subsequent induced-current in the sensor unit 6 and then feeding it as an output from the sensor unit 6 when the usually closed switch 25 is caused to be open owing by the touch of the movable stylus 23 of the touch sensor 20 with a workpiece. In short, the system of the present invention feeds an output from the sensor unit 6 when the the touch sensor 20 comes into contact with a workpiece, and produces the same effect as the system employing the touch probe assembly 1 shown in FIG. 3, since the latter system feeds an output from the sensor unit 6 when the instrument of the touch probe assembly 1 brings into contact with a workpiece. Accordingly, the system of present invention can advantageously utilize the touch-signal issue circuitry 8 of the system employing the touch probe assembly 1, without any change of the circuitry 8 or the NC apparatus 9, in order to send the amplified touch-signal 7 to the NC apparatus 9.

We claim:

1. A contact detecting system in a machine tool, comprising, in combination, a switch-contained touch sensor secured in a spindle of the machine tool and having a movable stylus for causing a usually closed switch to open as a result of contact with an object such as a workpiece to be detected; and an electromagnetic sensor unit mounted on the periphery of the spindle, for electromagnetically sensing an electrical closed-circuit, said electromagnetic sensor comprising an exciting coil wound around a core for causing an induced current to flow in said closed-circuit and a detecting coil wound around a core for detecting the closed circuit through a subsequent induced-current generated by mutual induction, wherein the touch sensor includes a step-up transformer and a control circuit in which the usually closed switch is incorporated and said control circuit utilizes an induced current generated in a secondary coil of the step-up transformer as a source of operating power and is designed to feed back an amplified current to the secondary coil of the step-up transformer when the usually closed switch is opened by the contact of the stylus with the object, while said closed-circuit followed by the induced current passes through the spindle of the machine tool, a casing of the touch sensor, a primary coil of the step-up transformer, a contact terminal provided on the casing of the touch sensor, a body of the machine tool communicating with the contact terminal, and connecting wires, whereby the sensor unit can feed an output for amplifying a touch signal when the usually closed switch is made open and does not feed an output when the usually closed switch is closed.

2. A contact detecting system in a machine tool as defined in claim 1, wherein the control circuit in which the usually closed switch is incorporated is comprised of a voltage multiplying rectifier including capacitors and diodes for obtaining a substantially double output of d.c. voltage from an a.c. voltage supply; a logic element comprising an NOT gate which functions so as to give a low magnitude of output voltage in relation to a high magnitude of input voltage when the switch is closed, or provide a high magnitude of output voltage in relation to a low magnitude of input voltage when the switch is open; and a load resistor connected to an output terminal of the logic element.

* * * * *